(12) United States Patent
Beth et al.

(10) Patent No.: US 10,635,744 B2
(45) Date of Patent: Apr. 28, 2020

(54) FILE FORMAT AGNOSTIC DOCUMENT VIEWING, LINK CREATION AND VALIDATION IN A MULTI-DOMAIN DOCUMENT HIERARCHY

(71) Applicant: ARIVIS AG, Munich (DE)

(72) Inventors: Dirk Karsten Beth, Phoenix, AZ (US); Oliver Bojahr, Bavaria (DE); Jarvis Garland, Tempe, AZ (US)

(73) Assignee: Arivis AG, Munich (DE)

( * ) Notice: Subject to any disclaimer, the term of this patent is extended or adjusted under 35 U.S.C. 154(b) by 279 days.

(21) Appl. No.: 15/491,660

(22) Filed: Apr. 19, 2017

(65) Prior Publication Data

US 2017/0308511 A1    Oct. 26, 2017

Related U.S. Application Data

(60) Provisional application No. 62/325,782, filed on Apr. 21, 2016.

(51) Int. Cl.
| | | |
|---|---|---|
| *G06F 16/90* | (2019.01) | |
| *G06F 17/22* | (2006.01) | |
| *G06F 17/24* | (2006.01) | |
| *G06F 16/93* | (2019.01) | |
| *G06F 16/28* | (2019.01) | |

(52) U.S. Cl.
CPC ........ *G06F 17/2235* (2013.01); *G06F 16/282* (2019.01); *G06F 16/93* (2019.01); *G06F 16/94* (2019.01); *G06F 17/2247* (2013.01); *G06F 17/241* (2013.01)

(58) Field of Classification Search
None
See application file for complete search history.

(56) References Cited

U.S. PATENT DOCUMENTS

| | | | | |
|---|---|---|---|---|
| 7,403,951 | B2 * | 7/2008 | Setlur | G06F 17/2211 |
| 7,493,322 | B2 * | 2/2009 | Franciosa | G06F 16/3334 |
| 7,822,779 | B2 * | 10/2010 | Chang | G06Q 10/08 |
| | | | | 707/802 |

* cited by examiner

*Primary Examiner* — Belix M Ortiz Ditren
(74) *Attorney, Agent, or Firm* — Falk Ewers; Ewers IP Law PLLC

(57) ABSTRACT

Linking within and among documents may include detecting at least one of intra-document and inter-document links present in a document; determining a document management project-specific document ID for the document; configuring a link resolution database with an entry for each detected link, each entry comprising link status, link direction, link type, source document link location information associated with the position of the link, and destination document link location information associated with a target viewing location in the destination document; and presenting the source document content in a user interface that overlays link annotations in a link annotation presentation layer over the presented source document content while associating the link annotations with a location of a link in the source document.

8 Claims, 10 Drawing Sheets

| General Information | | | | Source Document | | | Destination Document | | |
|---|---|---|---|---|---|---|---|---|---|
| State | Direction | Type | Text | Section | File Name | Page | Section | File Name | Page |
| ☑ | Out | Internal | Document A to named destination | 1.2 | Document A.pdf | 3 | 1.2 | Document A.pdf | 4 |
| ⚠ | Out | External | Document A | 1.2 | Document B.pdf | 1 | | | |
| ☑ | Out | Internal | Document B | 1.2 | Document B.pdf | 1 | 1.2 | Document B.pdf | 1 |
| ☑ | Out | External | Document C | 1.2 | Document B.pdf | 1 | 1.2 | Document B.pdf | 1 |
| ⚠ | Out | External | Document A page 2 | 1.2 | Document B.pdf | 2 | | | |

| General Information | | | | Source Document | | | Destination Document | | |
|---|---|---|---|---|---|---|---|---|---|
| State | Direction | Type | Text | Section | File Name | Page | Section | File Name | Page |
| ▶ | Out | Internal | Document A to named destination | 1.2 | Document A.pdf | 3 | 1.2 | Document A.pdf | 4 |
| ◀ | Out | External | Document A | 1.2 | Document B.pdf | 1 | | | |
| ▶ | Out | Internal | Document B | 1.2 | Document B.pdf | 1 | 1.2 | Document B.pdf | 1 |
| ▶ | Out | External | Document C | 1.2 | Document B.pdf | 1 | 1.2 | Document B.pdf | 1 |
| ◀ | Out | External | Document A page 2 | 1.2 | Document B.pdf | 2 | | | |

FIG. 1

Destination Documents

| | Document A |
| | Document B |
| | Document C |

Document A

Basic Links

Document A
Document B
Document C

| | General Information | | | | Source Document | | | Destination Document | | |
|---|---|---|---|---|---|---|---|---|---|---|
| State | Direction | Type | Text | Section | File Name | Page | Section | File Name | Page |
| | Out | External | Document A | 1.2 | Document B.pdf | 1 | | | |
| | Out | Internal | Document B | 1.2 | Document B.pdf | 1 | 1.2 | Document B.pdf | 1 |
| | Out | External | Document C | 1.2 | Document B.pdf | 2 | 1.2 | Document B.pdf | 1 |
| | Out | External | Document A page 2 | 1.2 | Document B.pdf | 2 | | | |
| | Out | Internal | Document B page 2 | 1.2 | | | 1.2 | Document B.pdf | 2 |

FIG. 2

FILE FORMAT AGNOSTIC DOCUMENT VIEWING, LINK CREATION AND VALIDATION IN A MULTI-DOMAIN DOCUMENT HIERARCHY

CROSS REFERENCE TO RELATED APPLICATIONS

This application claims the benefit of U.S. provisional patent application Ser. No. 62/325,782 (ARVS-0002-P01) filed Apr. 21, 2016, the entirety of which is incorporated herein by reference.

FIELD OF THE DISCLOSURE

The present disclosure relates to document management, and more particularly to the efficient management of linked or bookmarked documents in a multi-domain document hierarchy.

BACKGROUND OF THE DISCLOSURE

Large projects that involve many different documents sourced with different document creation and editing tools usually involve teams of contributors, reviewers, and editors. It is common for such teams to include members who are located in separate locations, often in separate cities or even countries. To effectively associate these dispersed contributors, documents typically provide carefully placed hyperlinks that are intended to facilitate a user jumping from one document to another to preserve context. Preserving cross-document links in such a multi-user multi-domain document creation and development environment is quite challenging as disconnected users may edit, delete, replace, and otherwise impact files that link to each other. Additionally, file format differences may make it challenging to ensure links redirect the user efficiently.

For specific applications such as submission of documents to government agencies such as the Food and Drug Administration (FDA) and the Environmental Protection Agency (EPA), additional requirements related to submitted file format, document storage hierarchy, link validity and the like impose additional challenges. These requirements and multi-domain file maintenance challenges suggest that there is a need for efficient and comprehensive document viewing, creation, management and validation of intra-document and inter-document links for source documents comprising a variety of source file formats across local, relative, cloud-based, and physical file storage systems.

SUMMARY OF THE DISCLOSURE

A file format agnostic document link creation, management, validation and viewing system and method, according to one embodiment facilitates converting an original set of source documents to a set of linked PDF documents that meets a submission requirement, such as for an FDA approval, by accessing a database of links and bookmarks associated with the original document. The database may be created and managed with link generation and management techniques, methods, and systems also described herein. The link generation and management techniques, methods and systems enable the use of a stored database of links and bookmarks, while also providing a user interface through which a user may access this database to edit, validate and recreate both intra-document and inter-document links that may ultimately be embedded in a PDF (or other) formatted document that may be suitable for FDA or other submission. These techniques, methods and systems also enable multiple users to create, edit, and/or remove links in documents through an interface that is accessible via a web browser, without the need to download any of these specific files that include links or that are being linked. This capability may be provided independent of where on a network, such as the Internet the files (e.g., source and/or destination) are stored. A link information database effectively holds information that facilitates resolving all intra and inter document links independent of the type of file storage hierarchy being used, such as a cloud or local disk-based storage system, to store the source files. Links in the link resolution database for a source document are indexed by source document ID.

The link creation and management system and method may further comprise generating a submission data set by converting each file referenced by a document ID into a portable document format (PDF); storing the files in a predetermined file structure; and inserting links that corresponds to links in the link resolution database into at least a portion of the PDF formatted files, wherein inter-document links reference a file in the predetermined file structure.

The link creation and management system and method user interface may facilitate viewing a source document with links independent of a location of the source document. The user interface may also facilitate placement of links over non-visible features of the source document. The user interface may further facilitate identification of a target viewing location in the destination document. The user interface may also facilitate concurrently viewing a link location in a source document and a corresponding target viewing location of a destination document, wherein information identifying the source document, link location destination document and target viewing area is stored in a corresponding inter-document link entry in the link resolution database.

The link creation and management system and method may further comprise generating a placeholder destination file that is identifiable by a destination document ID of an inter-document link in the link resolution database for which a destination document does not yet exist.

In accordance with an exemplary and non-limiting embodiment, a method comprises analyzing with a processor a first document that has been processed to identify at least one link, analyzing with the processor a second document to identify at least one similarity between the second document and the first document the similarity selected from the group consisting of a content, a format, a location in a document hierarchy and a file name and predicting with the processor at least one of a location and a content of a link for the second document based, at least in part, upon the at least one identified similarity. In this embodiment, the first document may comprise Food and Drug Administration (FDA) compliant content in an FDA compliant format.

In this embodiment, analyzing a first document may include applying a virtual link layer that associates links to locations in a document to the source document.

Further in this embodiment, predicting at least one of a location and a content of a link for the second document may be based at least in part on predetermined document content structure requirements.

Additional features, advantages, and embodiments of the disclosure may be set forth or apparent from consideration of the detailed description and drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to help explain the principles of the disclosure. No attempt is made to show structural details of the disclosure in more detail than may be necessary for a fundamental understanding of the disclosure and the various ways in which it may be practiced. In the drawings:

FIG. 1 is a table that shows the creation, storage, and status of links in a document.

FIG. 2 illustrates an editing function according to one embodiment on the present disclosure.

Figure 3:
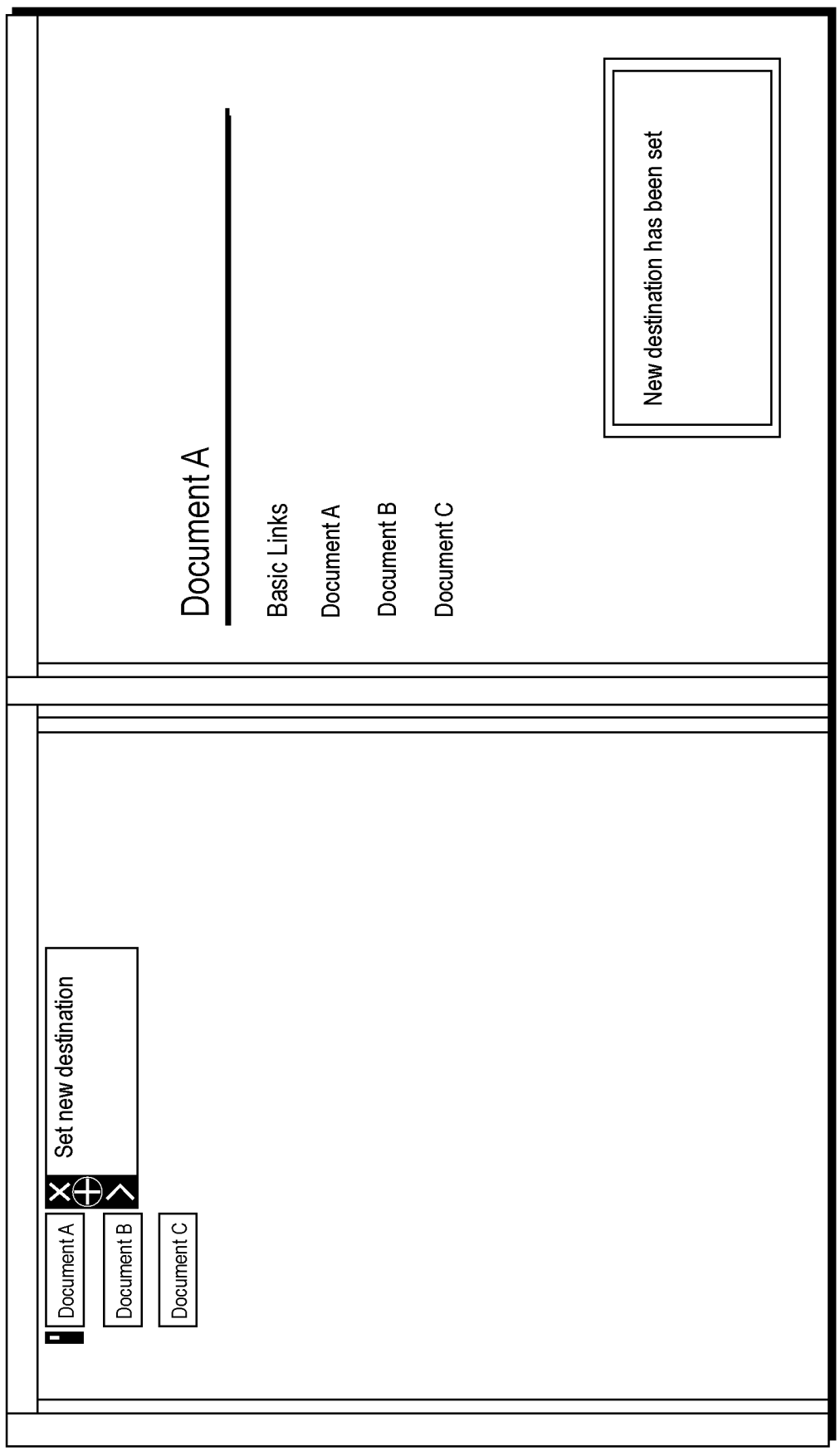
FIG. 3 illustrates the editing feature characteristics when a link is resolved according to one embodiment of the present disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein. Highly detailed descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the views of the drawings.

Methods and systems for link creation, management, and publication and the embodiments described herein may provide file storage system-independent linking across distinct files. A destination document may be identifiable using the methods and systems described herein from a link in a source document configured to reference a cross-file link database based on a context of a target file storage system. Rather than merely relative or absolute linking of files, the methods and systems described herein facilitate redirecting to a file via a link in a source file based on context other than the data in the link. Such an approach allows for configuring a single link in a source file and redirecting to different instances of a destination file based on context. In an example, during document preparation accessing the single link in the source file may redirect the viewer to a file within a document preparation environment that may include documents stored across any number of different Internet domains (e.g., servers, and the like) without the user having any need for determining where the file may be stored or who else may be editing it. Further in this example, during a production or publication phase, the same link, may redirect to a published copy of the destination file, such as one that may be locally stored in a file hierarchy that complies with predefined document submission requirements.

The methods and systems described herein may further provide a unified user interface that facilitates viewing, editing, linking and navigating within and across documents during both a distributed document preparation phase and a document production/publishing phase. Such a user interface would provide these capabilities independent of the specific hardware configuration or operating system of a user terminal (e.g., workstation, thin client device, wearable device, mobile device, personal computer, tablet, laptop, mobile phone, and the like), such as in the terminal's native web browser. The user interface would facilitate viewing each document independent of the document's original storage location (e.g., local disk-based location, Internet server-based location, and the like), file format, or hyperlink generation and use requirements. Such a user interface exposes to the user the visible features (e.g., text, figures, tables, headers, footers, and the like) and some non-visible features (e.g., white space around text, between paragraphs, and the like) of the document for placement of a link. Link placement functionality resolves the presentation of the document in the user interface with the underlying document in its native format (e.g., PDF) so that a link that is compatible with the native format may be placed into the source file, such as for production of a document set, and the like.

Through a web browser or other interface, a user can create a new link by selecting an element or portion of a displayed page, such as text, and the like that may be exposed in the user interface as a source of a cross-reference hyperlink. The user interface correlates the selected element or portion of the document to link-storing layer in the user interface so that the view presented to the user may appear and operate like a viewer that supports the native document format (e.g., ACROBAT™ for PDF files). In this way, the user sees the document plainly and link interactivity in the user interface may be similar to the native document viewer. In an example of operation of the user interface from the user's perspective, a user may select a word as a source of a link. Subsequently when the user moves a cursor or pointer over the selected word, it may change display (e.g., change color, change to being underlined, or some other change) to indicate that the word has been configured with a hyperlink. However, from the perspective of the user interface and underlying dynamic link management functionality described herein, user operations in the user interface may be interacting with the link-storage overlay, which may in turn interact with the underlying document to effect the changes in display of a visual element of the document configured as a source of a link. In this way, as the user performs link generation, editing, use, and other functions, the link management methods, systems, algorithms, and the like described herein may be operatively coupled to the user activity without requiring that the underlying document be modified. In effect, any cross-reference hyperlinks may be displayed in the web browser coordinated with but apart from the original document being presented in the web browser. The link-storage layer may enable the user to use these links to navigate within the document and throughout a document structure controlled by the link management methods and systems, entirely through a native web browser.

A link-storage layer, also referred herein to as a link annotation presentation layer, that may be used in this user interface may be dynamically generated in response to selecting a document to be viewed in the user interface. In the user interface, or other portal for accessing files under control of the link management methods and systems described herein, a user may specify a file for access through a file menu, file listing, typing in a portion of a name of a file, and the like. Selecting a file may also provide a pointer or other indication to a set of links, source document link source element, and associated link-storage overlay registration information. A document ID may be used as the pointer or may be used to generate such a pointer. Prior to or contemporaneous with presenting portions of a document (e.g., a page or the like) in the user interface, the link-storage overlay may be configured so that user interactions with the document in the user interface can be coordinated through the link-storage overlay. Information such as the portion of the source document associated with the link (e.g., the word, phrase, figure, white space, footnote, comment and the like), the link content and any associated metadata (e.g., link destination, priority, resolution status, and the like), and overlay registration information (e.g., multi-dimensional coordinates of the linking portion of the source document, and the like) may be accessed for each link to be made available to the user via the user interface. A link overlay facility may prepare data structures and the like that may be accessed by the user interface to effect the link access, interaction, and use functions typically associated with document-based hyperlinks as described above and elsewhere.

A link storage overlay may facilitate generation and access to sources of links as well as destination of links. In this way, all links for a viewed document may be accessible in the user interface through the overlay layer. Editing links may be performed by selecting the link source or the link destination. Editing features may be the same, similar, or different when selecting a link source versus selecting a link destination. In an example of editing a link from a link destination, the user interface may indicate link destinations in a document being viewed. The interface may facilitate a user selecting a link by accessing (e.g., clicking, double clicking, right clicking, or through some other interactive selection means and the like). An edit menu, pop-up window, or other indication of actions that may be permitted may be presented. A user may select an action, such as remove the destination, edit/change the destination, update a link resolution status, confirm a proposed link, and the like. User changes may be updated in the link storage database in near real time, periodically (e.g., every 5 minutes), when a document being viewed is closed, and the like.

Within the user interface, the user may also interactively select or otherwise identify a destination for each generated link. Information that unambiguously identifies a link destination may be gathered and stored in the link storage database so that it is retrievable whenever a document containing a source element for the link is accessed. If an intended link destination document is accessible through the user interface (e.g., is known to the link management methods and systems described herein), the user may bring up the intended destination document in the user interface (e.g., in a second viewable window of the user interface or in a coordinated second instance of the user interface). An overlay similar to the link-storage overlay used to generate and access source links may be prepared so that user interactions with the destination document in the user interface are coordinated through such a layer. In a way similar to selecting a document element, region, text or the like as a source for a link, a user may indicate a portion of the intended destination document as the destination of a link that is being worked on in the first user interface window.

To produce a document set that can be used outside of the user interface, the link database information may be used to enrich an output copy of the source document (e.g. PDF file) so that document format-specific link features may be enabled. In this way, access to links in a production copy of a document produce expected and reliable linking operations within any constraints or document and file structure standards that may be required in such a document set.

The methods and systems described herein may further provide capabilities to predict or suggest source file link placement and destination file attributes for a file that has similarities to files that have been processed through the methods and systems described herein. Through the use of a virtual link layer configured in the user interface that associates links to locations in a document, new files that have a similar content structure may leverage a corresponding virtual link layer for receiving suggested link placement information. As an example, files that must meet a common FDA content and file structure requirement likely may have links in similar locations. By applying information from prior files that meet these common FDA requirements, the methods and systems described herein may facilitate rapid prototyping of an FDA submission compliant file link database for new FDA submission projects.

Various document standards, particularly for use in the pharmaceutical industry, such as Electronic Common Technical Document (eCTD) that is used for industry to agency transfer of regulatory information, and Electronic Trial Master File (eTMF) that is used for organizing and storing document, images and other digital content for clinical trials, may dictate aspects of a document and/or a document set for providing compliant document sets. Due to a high degree of consistency in document content format and file structure, aspects such as document location in a structure and document content, such as section titles or numbers as text references, a link prediction and recommendation algorithm can use historical link location and link content information to determine a most likely source position of the cross reference link as well as a corresponding referenced destination. This approach is not only limited to folder structures but also includes document structures.

When considering how edits to underlying source documents may impact link integrity (e.g., a portion of the source file is deleted), information in the database of links may be used to suggest a location for such a link. Because links may change over time, it may be possible to store more than one link destination value. If, for example the saved link destination (e.g., an original unmodified location) and the link text are the same as in a previous document version it can reasonably be concluded that it is the same link even if it is not in the same location. Otherwise, if a link in the edited document is found in the same location as one from the original document and that link content also matches, but link destination does not match (for example), the methods and systems may flag the link as being similar. A secondary process, such as a user action may be used to resolve any dis-similarity of the link This situation may occur if the link text or destination were changed.

The methods and systems described herein may facilitate providing intra and inter document linking capabilities within an electronic Document Management System (eDMS), such as eCTD, eTMF and the like so that links can be generated and maintained while the documents are maintained within the eDMS. Adding document linking capabilities to an eDMS system avoids exposing the documents to loss of version control (changes made outside the eDMS are not tracked by the eDMS versioning capabilities); security risks due to documents being accessible outside of the security protocols within the eDMS; lack of encryption leaving the documents vulnerable to a range of problems including duplicating, and the like.

The methods and systems for link creation, validation, management and viewing within a document comprise a range of functions including document ingestion, link detection, link resolution, link database automatic and manual updating, annotated link presentation in the user interface, native file format link formation and placement, submission package production, and others.

We will start describing the various embodiments of functions with a description of an example document flow through the methods and systems of dynamic link type independent link management. Now turning to FIGS. 1-6, when a user uploads a source document, the document is parsed for existing links (e.g., links to other documents) and bookmarks (e.g., links to other locations within the same document) taking note of the destination path, link text and other information relevant to the link or bookmark. This information is then analyzed and stored within a link storage database 100, a non-limiting example of which is shown in FIG. 1. Specifically, each link is analyzed for certain attributes that are identified in FIG. 1 under general information, source document, and destination document. The general information for each link may be specific to a validity status or state of the destination of the link, a direction of the link (e.g., is the link instance the source or destination of the link), the type of link (e.g., internal or external), destination link format (e.g., fixed or relative to the source document file location or some other location), and text reference (e.g., the text, image, or region of the original document associated with the link). The link is also identified using the source document to specify information that facilitates locating the link in the document. Examples of source document attributes include the section, file name, page number, and the like. Finally, the database stores attributes that are similar to the source document location attributes, such as the section, file name and page number for a destination document for each specific link. Not all attributes may be available for each link at this time. Take for example the second and fifth entries in the link assessment table of FIG. 1. Both of these entries have a validity status of "X", which suggests that a destination of the link is not valid or known. This is reflected in the "Destination Document" fields for these entries being unpopulated.

It should be noted that although these specific identifiers are disclosed, other identifiers might also be used to identify each link. Other link attributes may include the state of the link, where a link may be associated with multiple states:

Internal—link points to a location within same document
External—link points to another document, or a location in another document
Weblink—link points to a website or other web specific location like http or email links
JavaScript—link executes JavaScript actions
Original—link has not been modified by the user
Modified—link has been modified by the system or user
Deleted—link has been deleted by the system or user
Broken—link destination is unknown and has yet to be fixed by the user Other link identifiers and/or attributes include an artifact revision number of the source document, meaning each revision has its own set of links. If the artifact revision number of the destination document is known and has changed, then the link integrity might be questionable. This information may be the basis for informing the user to double check that the link is still appropriate.

Link location information may also be useful as link attributes, such as a two-dimensional location of the link on a page may be used to determine where the link is on a specific page; page coordinates for opposing corners of a region of the underlying document associated with a link. Likewise link destination information may be useful when handling links. Link destination information includes destination regarding an offset from top and left page edge and/or margins that may be the location within a page to bring the user to, and optionally destination zoom—the viewing zoom level of the resulting document to access when the user clicks on the link. Additional link attributes may include the original destination that may be the original unmodified location of the destination. Note that this historical information can be used in subsequent revisions in order to determine if it is the same link or not. It could also be used for auditing and tracking purposes.

As each link is identified, the system classifies the link as either an internal or external link. Internal links are defined as links that refer to the same document whereas external links are defined as links that connect to external documents. External links are further defined as either an absolute link (e.g., a specific file name with a specific immutable storage location) or a relative link (e.g., a file whose storage location is defined only relative to the source file's storage location).

As each internal link is analyzed, the system matches the destination section and page for each link. The system then analyses each external link, and then attempts to match the destination file with an existing file within the cloud storage environment. If a match is found the unique identifier assigned to the external document along with the original destination will be placed in the database. If a match or an identifier for the external link is not found, then the link is entered into the database as incomplete and in need of user intervention. Matching may use the folder structure under which the documents are associated in the eDMS as well as their original imported folder structure. This supports cases where file system based links that were working offline when introduced into the eDMS will be resolved even if the eDMS structure might not match the offline file system structure.

As an example of a relative link type, if a document with a relative file system path of GrandParent/John/Time/Uploaded.pdf contains a link pointing to ../../Sam/Target.pdf the system may determine that the PDF being referenced is up two directories, and then within the Sam directory. A link-matching capability may take the current location of the source document within the eDMS or other file system and attempt to find the document by looking up two directories and then within a sub-directory (of the grandparent) that is named Sam. If this directory exists, it will then look for files with a matching filename. If a file is discovered then it can be concluded that it is the document being referenced.

If the link is not relative, then it may look into the system to find documents with the same filename and attempt to match the title of the document. If these two match then it can be concluded that is the document being referenced.

As each internal and external link are classified, any incomplete links may be resolved by users using a link management and resolution user interface, an embodiment of which is depicted in FIGS. 2 and 3. An unresolved link may be investigated by a user first clicking on the incomplete link within the user interface that facilitates link management through a link and document viewer that enables presentation of documents for linking in a format that is independent of the original source file format. Web browser compatible languages, such as HTML 5 and others may be used in the user interface. The user may then bring up a second document in another frame of the user interface and navigate to a destination in the document (e.g., a particular page) for the link. Bringing up the second document in another frame effectively cause the second document to be presented as an HTML 5 structure, which facilitates selecting any portion of the document as a designation. The user may then click a button in the user interface and the link resolution database will be updated to resolve the incomplete link to the new destination, as illustrated in FIGS. 2 and 3. Information about the destination, such as section, file name, page, and the like may be determined from a mapping of the original source document to the HTML 5 representation. Although modification of the source file may be effected in this way, it is not necessary to do so since any document required for a project, such as an FDA submission can be viewed with all links visible in the user interface, independent of where the user interface is executing and where the file is located.

Production document set rules may indicate the file names and at least locations of documents to meet submission criteria for various agencies, such as the FDA. In order for the a production set to meet and successfully complete submission validation, its documents may need to be positioned in a particular compliant hierarchy. Therefore such a hierarchy can be created in a specific manner (e.g., with directory names pre-determined). A document and link management project may be setup to comply with requirements for a specific regulatory body. In doing so, the methods and systems described herein may automatically create those expected pathways (e.g., the predetermined directory data), as well as placeholder documents within those directories. A placeholder document in this context may be an item with a particular file name that is made accessible within the system at a location where a document is expected to be placed.

While agency rules may dictate use of certain file structures and/or hierarchies, for any given automatically or manually created pathway, if the pathway has no files or only placeholder files, then a production document set may be produced without the pathway and/or reference to this location on the pathway. To improve the usability of such a document and link management system throughout the lifecycle of a submission preparation process, any document that is uploaded with existing links may cause placeholder files to be automatically generated at the otherwise "empty" destination locations.

Figure 4:
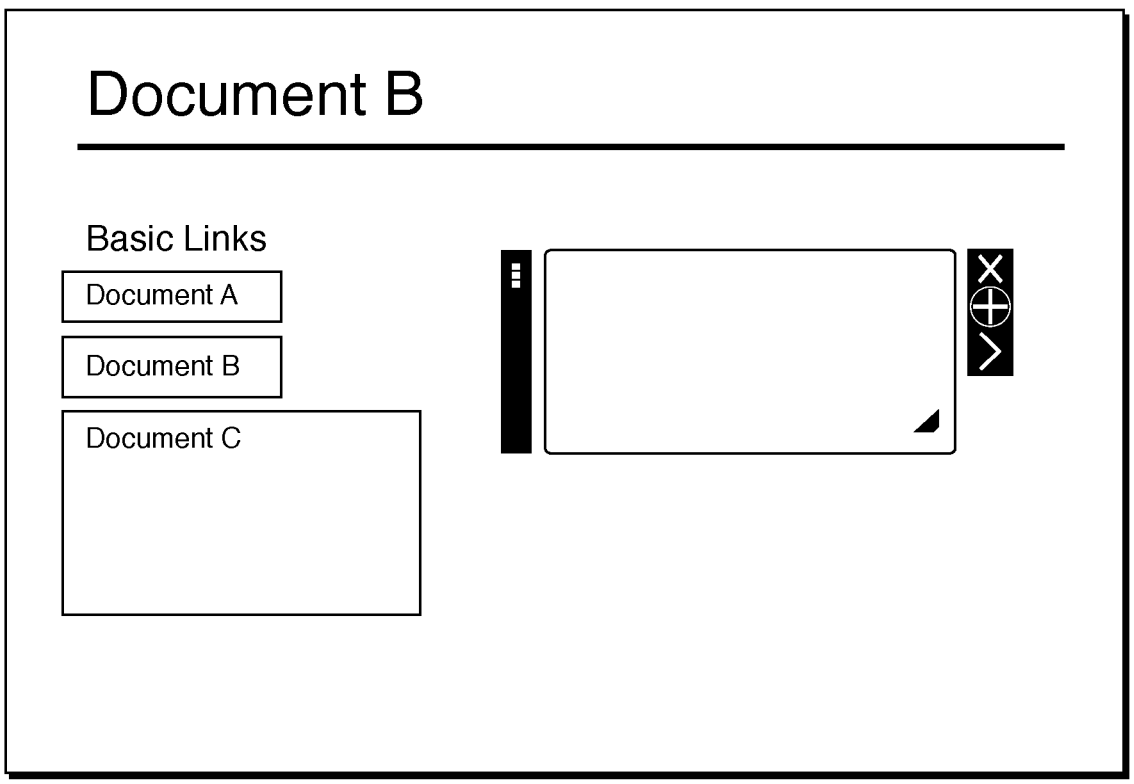
FIG. 4 illustrates the editing feature for creating a link in the document according to one embodiment of the present disclosure.

The interface supports users editing links, deleting links, and other link management functions by clicking on the link outlines. In one preferred embodiment of the present disclosure, a blue outline is used for functional links, while red is used for incomplete links. The system also enables users to create links by selecting a region of the displayed document (e.g., as depicted in the embodiment of FIG. 4, by drawing rectangular shaped objects on an overlay that sits on top of the HTML 5 viewer), as well as selecting a visible object, such as an image, an existing link, paragraph numbers, the text and the like. In these ways creation of links is not limited to only text but links may also be created over graphics and even empty/white spaces. The system also allows users to reposition the region associated with a link, such as by dragging an identified region around in the HTML 5 viewer to move them to different locations as well as change the size, shape, and other aspects of the link region. When ready, the user may select a destination for the new link by viewing a second PDF in another frame, navigating to the intended location in the destination (e.g., a page, section, table of contents entry, paragraph, graphic, and the like) and then clicking on a link association button. Once the user clicks on the link association button, the database is updated with the newly created link. So that all users who may be viewing a document associated with the source or destination may see this change in near realtime, a document refresh type signal with the new link information may be propagated to each user interface instance that currently has access to the associated file.

When the document is requested for publishing, such as for access to the document outside of the link creation and management system the links must be configured so that they resolve properly without use of the link database. To accomplish this, a rendition of the document is created by clearing all existing links and replacing them with a publishable version of the links referenced in the database. Those links, which are functional, may be inserted with the intended relative destination, such as one that might be suitable for a multi-document FDA submission. Use of relative destination links requires that a folder hierarchy into which the document will be published will closely match the folder hierarchy that may be configured for the publishing document and its linked document as it exists within the cloud system. Alternatively, a preconfigured folder and file hierarchy may be used that may not necessarily be similar to the cloud system.

Figure 7:
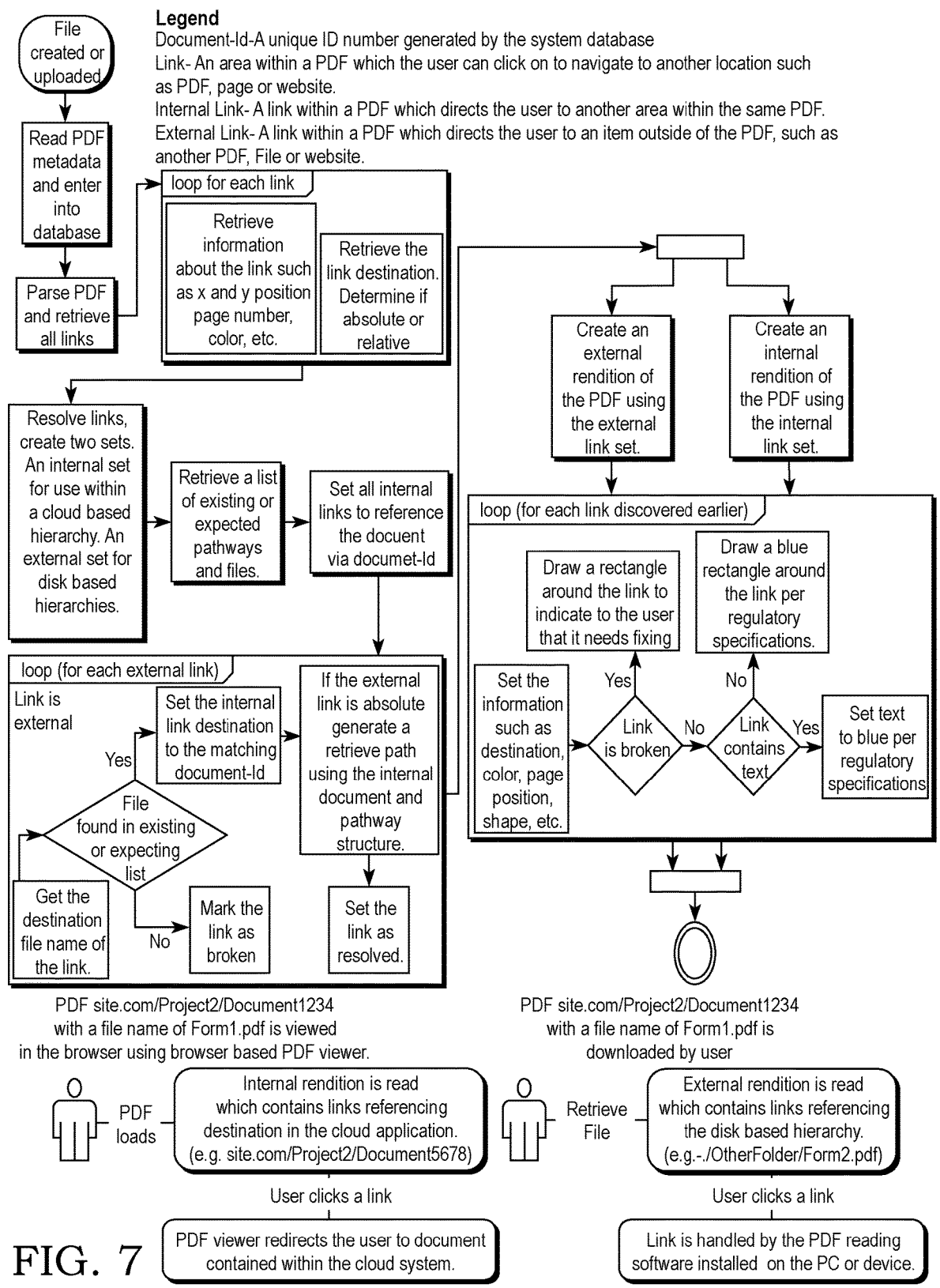
FIG. 7 is a flowchart that illustrates the functionality of the document management system according to an exemplary embodiment of the present disclosure.

FIG. 7 shows a flowchart that illustrates more detailed principles of the present disclosure. Once a document file is created and/or uploaded, metadata of the document is analyzed and stored into a database. Next, the document is reviewed and all links are retrieved and analyzed. For each link that is retrieved, data corresponding to each link such as X and Y position, page number, color, table number, table of contents entry, book mark, heading reference, figure indicator, position relative to a page margin, and the like, link destination and if the link is absolute or relative is stored. The system then attempts to resolve the links and creates at least two sets of links. The first set of links facilitates using a cloud-based document location architecture, (e.g., a multi-domain file hierarchy). This first set of links is suitable for use within the link creation, management, and document viewing system described herein. The second set of links facilitates use of disk based document location hierarchies. Once these two sets of links are created, the system then retrieves a list of existing or expected pathways and files using its knowledge of other potentially linkable documents, such as those that have been uploaded and/or created using the link configuration, management, and document viewing method and systems described herein. The list of existing or expected pathways and files has a document ID associated with each document. The first set of links that point to a location within the current document are then set to facilitate cross referencing an appropriate source and destination location within the document and are associated with the document's document ID from the list of existing or expected pathways and files.

In a separate loop function for all external links in the document, e.g., links that are associated to locations external to the document, the system compares the destination filename from the external link with filenames in the list of existing or expected pathways and files. If the filename is found in an existing or expecting list, then a corresponding link destination in the first set of links is set to the matching document destination (e.g., the corresponding document ID from the list). If the external link is defined as an absolute file location, then a pathway is generated using the document ID and pathway structure found above in the list, and the discovered document link is set as being resolved. If the external file name cannot be matched to a file in the list of existing or expected files, the link may be marked as broken and flagged for alternate resolution.

Figure 5:
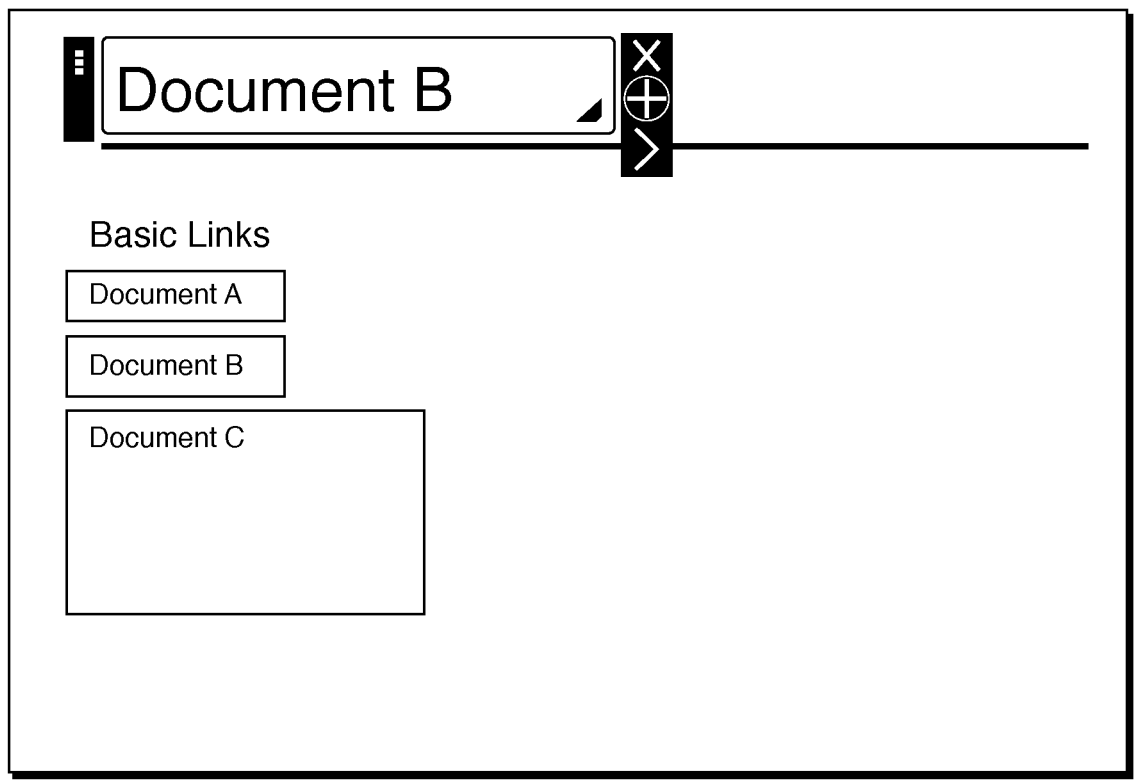
FIG. 5 illustrates the editing feature for editing text in a link according to one embodiment of the present disclosure.
Figure 6:
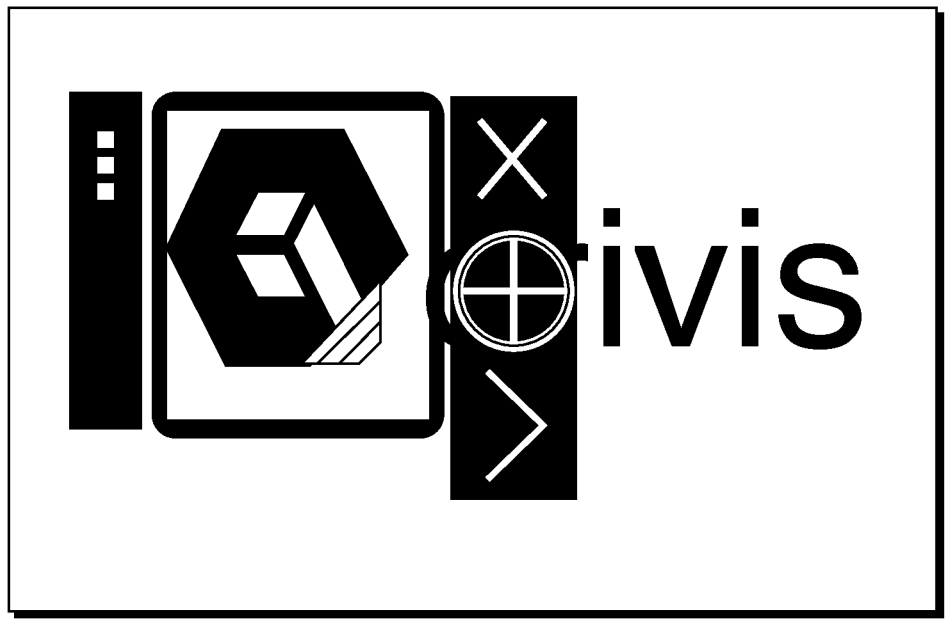
FIG. 6 illustrates the editing feature for editing a link that is created over an image according to one embodiment of the present disclosure.

After a document has gone through the link detection and resolution process above, the file may be generated in a format (e.g., PDF) that is intended to, for example meet FDA, EPA or other submission requirements. Each link is marked based on its status and underlying document content. A shape may be drawn around the link to indicate to the user viewing the document that it may require edits. FIG. 5 depicts such an embodiment. If the link is associated with a portion of the source document that contains text, the text in one embodiment is set to a blue color to facilitate recognition by a user. If there is no text within the link, as shown in the embodiment of FIG. 6, then a shape, such as a blue rectangle may be drawn encircling the link. It should be noted that while any colors and/or shapes may be used to mark the link, such as for requiring edits, the colors and/or shape may preferably comply with a document submission requirement, such as may be associated with an FDA, EPA or other approval process. Once these markings are provided on the documents, users may be able to edit the links in the document.

Documents processed as above may be viewable through the link creation, management, and viewing methods and systems described herein. They may also be viewable outside of these methods and systems, such as by using existing document viewing/editing applications like Adobe Acrobat™ and the like. Both of these ways of viewing such a document is depicted in FIG. 7. For viewing a document that is linked in the file within a web browser using the document viewing capabilities of the system described herein, the first set of links is used to resolve the destination information provided by the links. Once the link destination is resolved, the destination document is retrieved from the cloud storage system and presented to the user.

For viewing a document processed as described above, a PDF rendition of the document is downloaded by the user. Since the PDF rendition is created with links suitable for use with a disk based hierarchy, once the user clicks on a specific link using, for example PDF reading software that is installed within the PC or device, a file, typically within the same disk based hierarchy as the PDF rendition document, that is identified in the link is retrieved and presented to the user.

Figure 8:
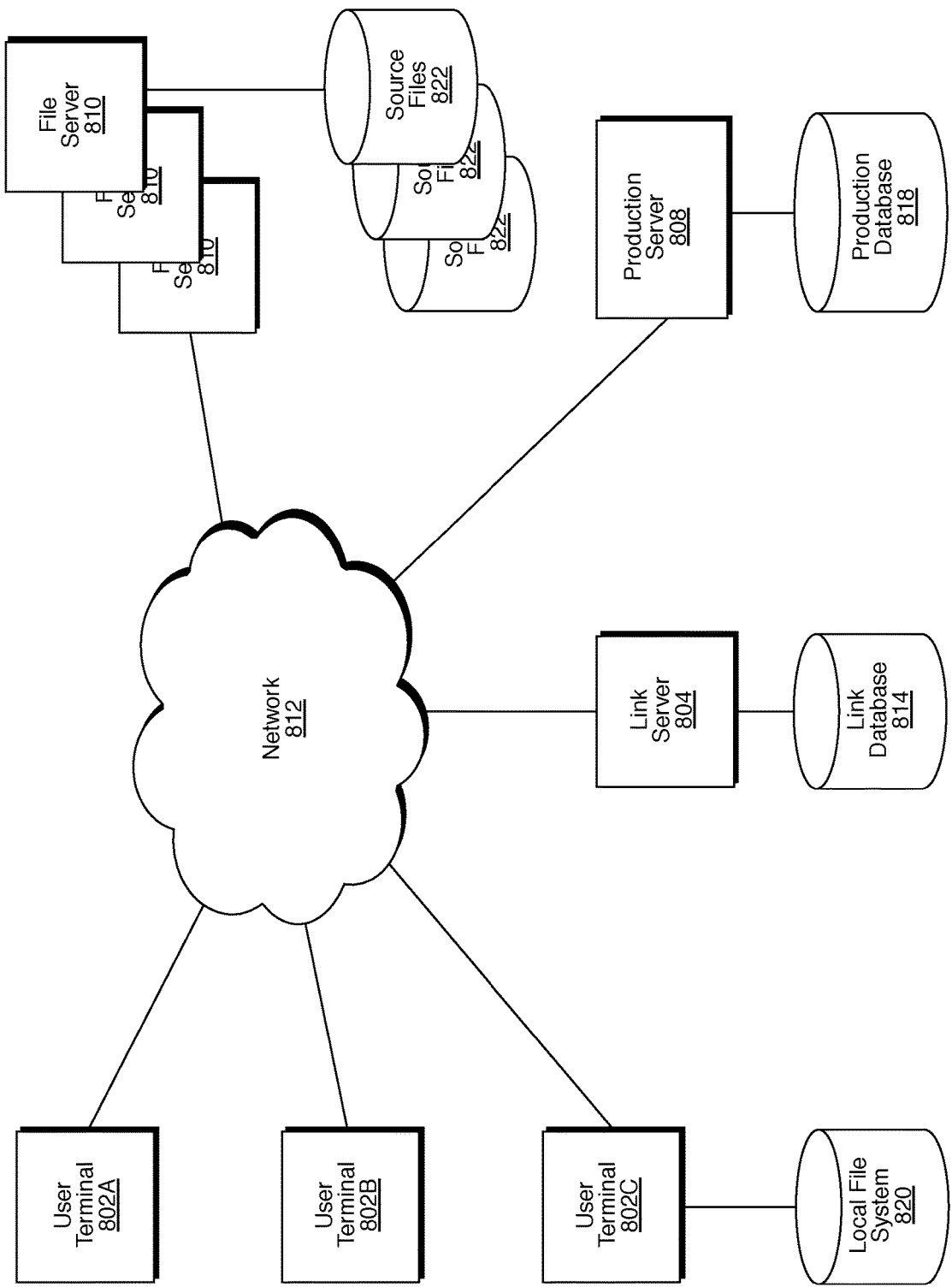
FIG. 8 is block diagram of a system for performing various exemplary and non-limiting embodiments described herein.

With reference to FIG. 8, there is illustrated an exemplary and non-limiting embodiment of a system 800 for practicing embodiments described herein. As illustrated, one or more user terminals 802A-802C may communicate via a network 812 with one or more of a link server 804, a production server 808 and one or more file servers 810. Each user terminal 802 may further be in communication with a local file system 820. Each file server 810 may communicate with one or more source files 822. Each link server 804 is in communication with link database 814 while the production server 808 may communicate with a production database 818.

Figure 9:
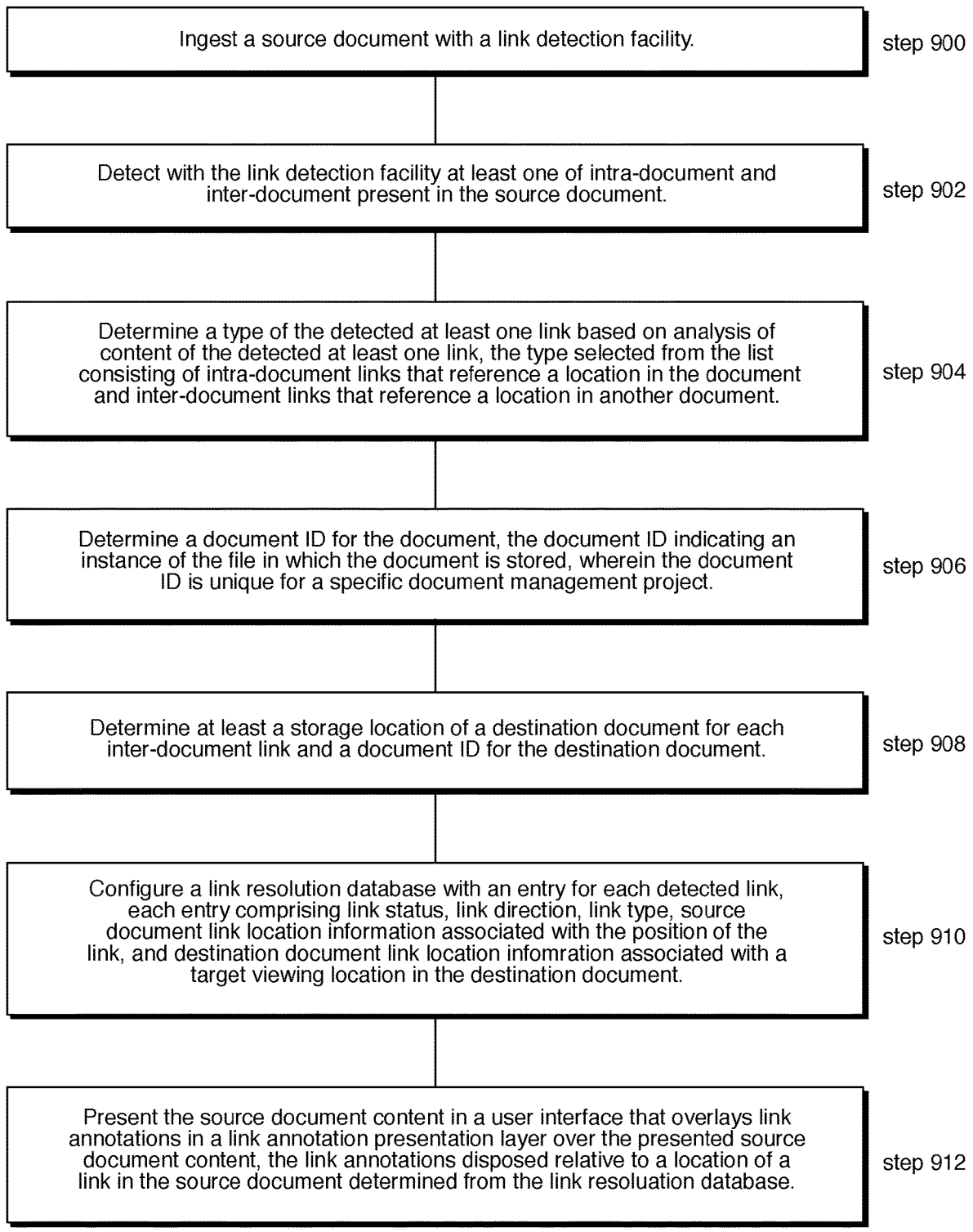
FIG. 9 is a flowchart of an exemplary and non-limiting embodiment.

With reference to FIG. 9, there is illustrated an exemplary and non-limiting embodiment of a method. At step 900, a source document is ingested with a link detection facility. At step 902, the link detection facility detects at least one of intra-document and inter-document links present in the source document. At step 904, a data type of the detected at least one link is determined based on analysis of content of the detected at least one link, the type selected from the list consisting of intra-document links that reference a location in the document and inter-document links that reference a location in another document. At step 906, a document ID for the document is determined, the document ID indicating an instance of the file in which the document is stored, wherein the document ID is unique for a specific document management project. At step 908, at least a storage location of a destination document for each inter-document link and a document ID for the destination document is determined. At step 910, a link resolution database is configured with an entry for each detected link, each entry comprising at least two values selected from the list of link resolution database values consisting of: link status, link direction, link type, source document link location information associated with the position of the link, destination document ID, and destination document link location information associated with a target viewing location in the destination document. Finally, at step 912, the source document content is presented in a user interface that overlays link annotations in a link annotation presentation layer over the presented source document content, the link annotations disposed relative to a location of a link in the source document determined from the link resolution database.

Figure 10:
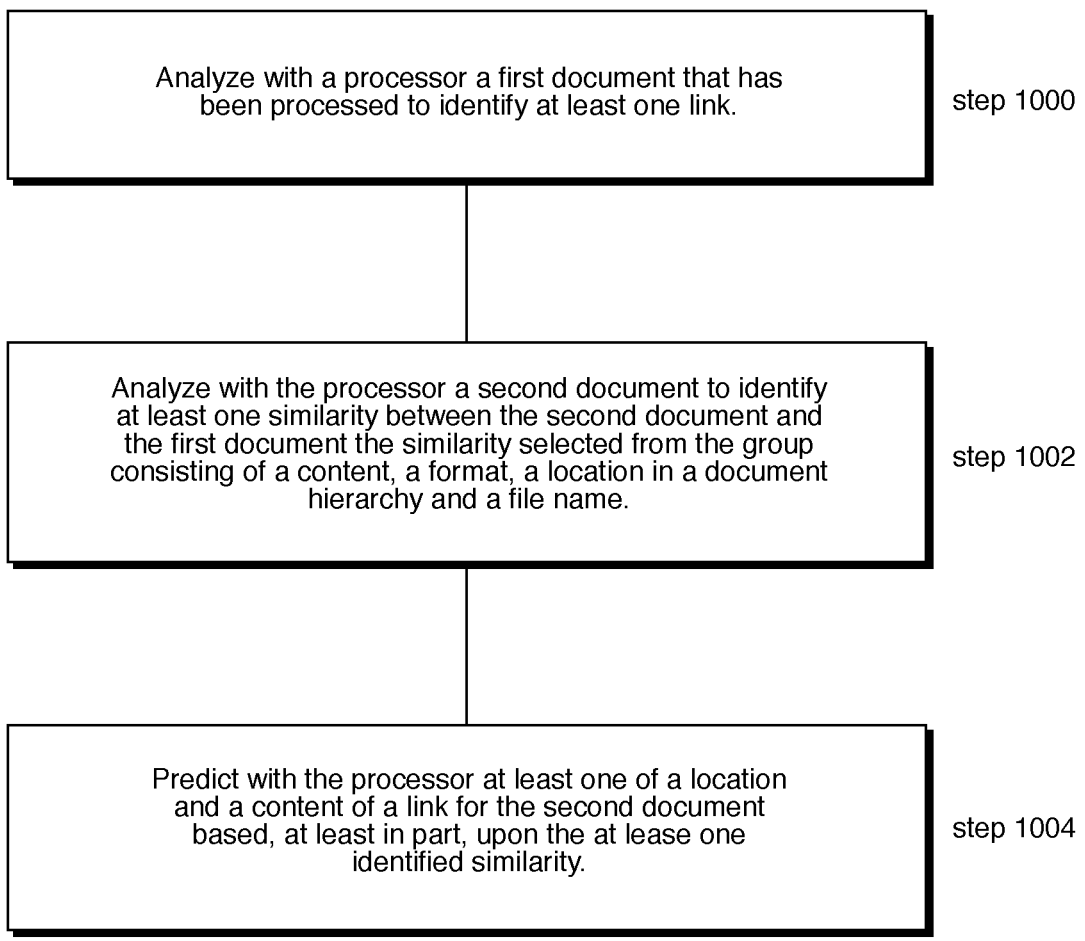
FIG. 10 is a flowchart of an exemplary and non-limiting embodiment.

With reference to FIG. 10, there is illustrated an exemplary and non-limiting embodiment of a method. At step 1000, a processor analyzes a first document that has been processed to identify at least one link. Then at step 1002 the processor analyzes a second document to identify at least one similarity between the second document and the first document the similarity selected from the group consisting of a content, a format, a location in a document hierarchy and a file name. Finally, at step 1004, the processor predicts at least one of a location and a content of a link for the second document based, at least in part, upon the at least one identified similarity.

Now turning to another embodiment of the present disclosure, the present document management system may also provide the feature of predicting locations for and content of links in a new document based on similarities to a previously generated document. For instance, in this embodiment, the system may automatically analyze two documents, one that has been previously processed through the link detection and resolution process of FIG. 7, and another that has not yet been through such a process. The analysis may recognize similarities among the documents (e.g., similar content, similar format, similar location in the document hierarchy, file name, and the like) to configure a set of candidate links for the document. The candidate set of links may be configured based on retrieved link data from an existing link database. A version of the new document may be presented to the user in the document viewer interface described herein with the candidate links so that a user may edit the new document using, for example, the techniques described herein.

Yet in another embodiment, the present system may enable multiple users to create and edit links for a single document. As the document and the database of links are stored in a cloud based system, the system allows for multi-user capabilities for creating/editing the document, such as by resolving conflicting access to a link or document by more than one user. This may be achieved by locking the smallest entity so that only one user at a time can modify a link. In this case a hyperlink itself may be locked, rather than the whole document. Consequently, concurrently working users can edit only those links that are not selected by other users. However, adding links may not follow this restriction and may be allowed by any concurrent user. This allows parallel review of incomplete links for one user and enrichment with new links whether internal or external to other users. Such an approach supports applying a link editing approval mechanism before link changes are made available to other users to ensure approved links are not modified accidentally.

Further such a locking mechanism ensures that only one change may be made at any given time. In an embodiment a locking mechanism that supports multiple users may be provided by a relational database function that includes the link cross-reference table. When a user makes a change in the user interface to a document that impacts a link, the link table in the database may be locked for the brief time required to implement the change in the database; this process typically only takes a few milliseconds. Once the change is complete, the document may be reloaded in the user interface to reflect changes made from the user and/or other users.

Changes to the document and/or links made by other concurrent users may only appear when the user reloads the page (such as navigating away and returning, viewing another document and returning, etc.) or when the user makes a change, necessitating reloading the page upon completion of updating the link table.

In another embodiment of the present disclosure, the document link creation, management, and document viewing system described herein facilitates cross document link navigation through a web browser user interface. By resolving links as described above, such as per the methods and systems depicted in FIG. 7, an embodiment enables cross document links to work on a file system using relative and absolute paths. The link resolution and pathway management techniques described above facilitate accessing a target document for a link regardless of the link indicating a relative or absolute path to the destination. This feature enables a centralized pathway for viewing interlinked documents, thus allowing users to access the documents efficiently.

In another embodiment of the present disclosure, the document management system as disclosed may be applied specifically for regulatory submission, specifically for FDA submissions. The FDA approval and submission process includes well-defined process elements that require information to be uploaded into an FDA database for review. All submissions to the FDA typically follow a specific process that includes the validation of linking among the documents submitted. Since documents submitted to the FDA include a large amount of data from clinical trials, research publications and testing results, there are a large number of links provided within such submission. The present system enables users to manage this process through efficient use of the first and second links of the links database described above. It should be noted that the present system is not only available for such as the FDA submission platform, it may also be used for any structured document submission platform. A structured document submission platform, such as the FDA platform may have document linking, structural, formatting, and file hierarchy requirements that may be preconfigured into metadata, the link database, an expected document/file list, and the like. This may further enhance the capabilities for managing a document submission process by helping a user to determine a degree of confidence that a submission package of documents may meet the submission requirements. Indications such as missing links, broken links, candidate links, and the like may be flagged and presented to the user in one or more user interfaces.

There has herein been described a document link management system for FDA or other rules-based document preparation processes. The system makes editing of files more efficient than that achieved by known processes. This efficiency arises, in part, because the user need only have access to a web browser in communication with a link storage database. The user does not require access to a document management system or local copies of files that the user privately edits and then reconciles with edits being performed by others. Also, since the interface to the link storage data is via a web browser that accesses a centralized document access system, multiple users can edit and link to a document at the same time without risking overwriting each other's work, again, without need to access the files locally. Efficiency is therefore achieved through both the elimination of the redundant storage of local file data, improving both efficiency and data storage requirements, and by allowing users to work in parallel without the risk of data overwrites.

The system further improves computer operation through reduced network activity as entire files no longer have to be passed around the network to configure and validate inter-file links. In addition, fewer demands are placed on the user's local computer as a file no longer needs to be downloaded to the local computer to create, edit, and maintain inter-file links resulting in less computing and less memory demand. This may save computer resources overall because an author of a specific files can keep the file on his/her computer. It does not have to be transferred around the internet to allow others to access the file, to create links in it, to create links to it, etc.

A project, such as a set of documents for FDA trials submission may include hundreds or even thousands of documents that must be interlinked according to specific requirements. Doing this manually (e.g. through various bookmarking tools for PDF files) and/or with basic file locking technology was inefficient and resulted in problems at the back end when production of the PDFs (or the like) needed to be submitted. The system further increases computer efficiency by managing the links as a database that can be separated from the documents so that as new versions of documents are provided, the links do not need to be manually recreated.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The server may execute the methods, programs or codes as described herein and elsewhere. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The client may execute the methods, programs or codes as described herein and elsewhere. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be a frequency division multiple access (FDMA) network, code division multiple access (CDMA) network, or the like. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

We claim:
1. A method of inter-file linking, comprising:
ingesting a source document with a link detection facility;

detecting with the link detection facility at least one of intra-document and inter-document links present in the source document;

determining a type of the detected at least one link based on analysis of content of the detected at least one link, the type selected from the list consisting of intra-document links that reference a location in the document and inter-document links that reference a location in another document;

determining a document ID for the document, the document ID indicating an instance of the file in which the document is stored, wherein the document ID is unique for a specific document management project;

determining at least a storage location of a destination document for each inter-document link and a document ID for the destination document;

configuring a link resolution database with an entry for each detected link, each entry comprising at least two values selected from the list of link resolution database values consisting of: link status, link direction, link type, source document link location information associated with the position of the link, destination document ID, and destination document link location information associated with a target viewing location in the destination document; and presenting the source document content in a user interface that overlays link annotations in a link annotation presentation layer over the presented source document content, the link annotations disposed relative to a location of a link in the source document determined from the link resolution database.

2. The method of claim 1, further comprising generating a submission data set by converting each file referenced by a document ID into a portable document format (PDF); storing the files in a predetermined file structure; and inserting links that correspond to links in the link resolution database into at least a portion of the PDF formatted files, wherein inter-document links reference a file in the predetermined file structure.

3. The method of claim 1, wherein the user interface facilitates viewing a source document with links independent of a location of the source document.

4. The method of claim 1, wherein the user interface facilitates placement of links over non-visible features of the source document.

5. The method of claim 1, wherein links in the link resolution database for a source document are indexed by a source document ID.

6. The method of claim 1, wherein the user interface facilitates identification of a target viewing location in the destination document.

7. The method of claim 1, further comprising generating a placeholder destination file that is identifiable by a destination document ID of an inter-document link in the link resolution database for which a destination document does not yet exist.

8. The method of claim 1, wherein the user interface facilitates concurrently viewing a link location in a source document and a corresponding target viewing location of a destination document, and wherein information identifying the source document, link location destination document and target viewing area is stored in a corresponding inter-document link entry in the link resolution database.

* * * * *